Patented Sept. 11, 1951

2,567,675

UNITED STATES PATENT OFFICE 2,567,675

PLASTIC COMPOSITIONS FROM COPOLYMERS OF UNSATURATED ESTERS OF ETHEREAL OXYGEN-CONTAINING ACIDS

Kenneth E. Marple, Oakland, and Edward C. Shokal, Walnut Creek, Calif., assignors to Shell Development Company, San Francisco, Calif., a corporation of Delaware No Drawing. Application September 28, 1949, Serial No. 118,476

13 Claims. (Cl. 260—78.5)

This invention relates to plastics and more particularly to synthetic resins and related plastics comprising copolymers of polymerizable unsaturated esters of ethereal oxygen-containing acids and polymerizable unsaturated esters of aromatic polycarboxylic acids.

Synthetic resins can be produced by the polymerization of compounds containing in the molecule one or more polymerizable unsaturated carbon-to-carbon linkages. None of the resins so far produced is suitable in all of the uses to which organic plastics may be put and some of the most productive research efforts have been attempts to create particular plastics for special applications.

We have created a new group of "tailor-made" plastics, which more satisfactorily fulfill the requirements of certain exacting uses, more particularly described hereinafter, than any materials previously available, so far as we are aware. We have discovered that by co-polymerizing a polymerizable unsaturated ester of an ethereal oxygen-containing carboxylic acid with one or more esters of aromatic polycarboxylic acids, each containing in the molecule two or more polymerizable unconjugated unsaturated carbon-to-carbon linkages, there can be obtained plastic substances having new physical and/or chemical properties which are unpredictably different from the polymers of any of the compounds alone. These new plastics by virtue of their properties open up new lines of investigation and make possible the fabrication of hitherto unavailable articles. An example of articles which can be produced from such copolymers consists of glass cloth laminates of improved transparency.

Accordingly, it is an object of the present invention to produce new synthetic resins designed for the fabrication of laminated articles. Another object is the production of improved transparent laminates. Another object is the production of articles comprising synthetic resin copolymers. Another object is the production of plastics of new and valuable properties. Another object is to provide new polymerizable compositions. Other objects will be apparent from the description of the invention given hereinafter.

These objects are accomplished in accordance with the present invention by polymerizable compositions comprising a polymerizable polyester of an unsaturated alcohol with an ethereal oxygen-containing polycarboxylic acid and an ester of an aromatic polycarboxylic acid containing in the molecule two or more polymerizable unconjugated unsaturated carbon-to-carbon linkages, by the polymerization thereof, by the resulting copolymers and compositions containing them, and by the use of the copolymers in the production of articles of many kinds.

The resinous copolymers of the invention can, for example, be used in the production of high quality glass or other transparent fiber-reinforced laminates having a degree of transparency which we have not been able to produce in any other way. In order to be satisfactory for most purposes a laminated article must have relatively high tensible strength, compressive strength and flexural strength. It must have low moisture absorptiveness; it must be resistant to the chemical and physical action of a large number of organic and inorganic substances; it must be reasonably free from imperfections which mar its appearance or impair one or more other physical properties. It must often further be capable of being produced in simple and compound curvaceous three-dimensional shapes under adverse fabricating conditions which may permit the use of only relatively low pressures, e. g. 19–100 p. s. i., and low temperatures, e. g. less than 200° C. It should also be capable of forming a strong, relatively permanent bond with fibers with which it is used. While laminates comprising a transparent resin reinforced with glass cloth or like transparent fibers offer the tantalizing possibility of transparency, there have so far been no available resins having refractive indexes closely matching those of commercial glass cloth or the like, and at the same time, capable of producing laminates of the other required physical properties.

It has been found that glass cloth or other transparent fiber-reinforced articles of improved transparency can be formed by the use as a binder therefor of copolymers of unsaturated esters of ethereal oxygen-containing acids and unsaturated esters of aromatic polycarboxylic acids wherein the proportions of these esters are within the range of about 30% to about 45% of unsaturated esters of ethereal oxygen-containing acid to about 70% to about 55% by weight of said unsaturated esters of aromatic polycarboxylic acid. Without measurably impairing the strength of the article the proportions of the two polymerizable ester reactants can be so selected in this range as to provide an astonishingly high degree of transparency. In general, the procedure consists essentially in providing the polymerizable ester reactants in such proportions and controlling the polymerization degree so that the refractive index of the resulting resin is substantially identical to that of the glass or other transparent fiber with which it is used, although reasonably satisfactory results are obtained when the refractive index ($n_D^{20}$) of the resin differs from that of the glass or other fiber by as much as about ±0.005.

The ethereal oxygen-containing polycarboxylic acids, with the unsaturated esters of which the invention is concerned, have in the molecule at least two carboxyl groups separated from one another by an ethereal oxygen atom. They may be represented by the general formula $$HOOC-(R)_n-O-R_1-COOH$$

wherein R and $R_1$ are each a divalent organic radical, preferably a divalent hydrocarbon radical, which may or may not be substituted by halogen, alkoxy, hydroxy or like groups, and $n$ is a member of the series 1, 2, 3 . . . A preferred subgroup consists of acids corresponding to the above formula in which $n$ is 1. The organic radicals represented by R and $R_1$ may be saturated or unsaturated, and may be aliphatic or cycloaliphatic in character.

Examples of divalent hydrocarbon radicals are methylene, ethylene, ethylidene, tetramethylene, butylidene, methyl ethylene, ethyl ethylene, pentamethylene, amylidene, methyl butylene, ethyl propylene, propyl ethylene, hexylene, decamethylene, cyclopentylene, cyclohexylene, etc. Many other hydrocarbon radicals, as well as other organic radicals, are suitable.

Representative examples of acids of the above formula are diglycolic acid

[HOOC—CH$_2$—O—CH$_2$—COOH]

dilactic acid

[HOOC—CH(CH$_3$)—O—CH(CH$_3$)—COOH]

dihydracrylic acid

[HOOC—CH$_2$—CH$_2$—O—CH$_2$—CH$_2$—COOH]

methyl ethyl ether-alpha,beta'-dicarboxylic acid [HOOC—CH$_2$—O—CH$_2$—CH$_2$—COOH], di-n-butyl ether-delta,delta'-dicarboxylic acid

[HOOC—CH$_2$—CH$_2$—CH$_2$—CH$_2$—O—
CH$_2$—CH$_2$—CH$_2$—CH$_2$—COOH]

divinyl ether-beta,beta'-dicarboxylic acid [HOOC—CH=CH—O—CH=CH—COOH], ethyl vinyl ether-alpha,beta'-dicarboxylic acid

[HOOC—CH(CH$_3$)—O—CH=CH—COOH]

dicyclohexyl ether-4,4'-dicarboxylic acid

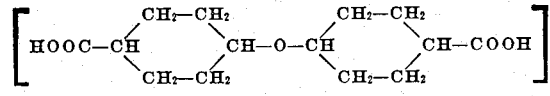

and methyl etheyl ether-alpha,beta'-dicarboxylic acid [HOOC—CH$_2$—O—CH$_2$—CH$_2$—COOH].

Other suitable acids contain three or more carboxyl groups. Preferred acids are saturated dicarboxylic acids of 4 to 10 carbon atoms per molecule.

The invention is concerned with copolymers of esters of the above-identified acids in which the hydrogen atom of at least one of the ethereal oxygen-separated carboxyl groups has been replaced by an aliphatic or cycloaliphatic radical of 2 to 8 carbon atoms which is connected to an oxygen atom of said carboxyl group by a carbon atom which is directly joined to a carbon atom to which an unsaturated linkage of aliphatic character, that is, an olefinic or acetylenic linkage, between two carbon atoms is directly attached. Preferably the hydrogen atoms of two of the ethereal oxygen-separated carboxyl groups are substituted by hydrocarbon or halo-substituted hydrocarbon radicals of the foregoing type. These compounds can be described also as esters of alcohols having an unsaturated linkage of aliphatic character between two carbon atoms, at least one of which is not more than once removed from an alcoholic hydroxyl group.

One subgroup of unsaturated esters within the foregoing definition consists of ethereal oxygen-containing polycarboxylic acids wherein the hydrocarbon or halo-substituted hydrocarbon radical substituted on the carboxyl group of the acid contains an olefinic double bond of aliphatic character between two carbon atoms, one of which is directly attached to an oxygen atom of said carboxyl group. These compounds may be regarded as esters of vinyl-type alcohols which may be represented by the general formula:

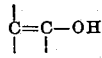

Preferred esters of this type are those having a terminal methylene group attached by an olefinic double bond to the carbon atom which is directly linked to the oxygen atom of the carbonyl group of the ethereal oxygen-containing polycarboxylic acid. Examples of preferred vinyl-type esters are vinyl esters, isopropenyl esters, 1-ethylvinyl esters, etc. Examples of other esters of vinyl-type alcohols are propenyl esters, 1-butenyl esters, 1-cyclohexenyl esters, and 1-cyclopentenyl esters, etc. Vinyl esters are the preferred specific esters of alpha-unsaturated alcohols.

Another important subgroup of the unsaturated esters of ethereal oxygen-containing polybasic carboxylic acids used in preparing the copolymers of the invention consists of esters of alcohols having an unsaturated linkage of aliphatic character between two carbon atoms, one of which is attached directly to a saturated carbon atom which in turn is attached directly to an alcoholic hydroxyl group. These are the beta-unsaturated alcohols. The unsaturated carbon-to-carbon linkage may be a triple bond, as in propargyl alcohol, 2-methyl-butyn-3-ol-2, 2-methyl-hexyn-3-ol-2, octyn-2-ol-1, nonyn-2-ol-1, decyn-3-ol-2 and 2-methyl-nonyn-3-ol-2.

More commonly, the unsaturated carbon-to-carbon linkage is a double bond. Compounds having a double bond of aliphatic character between two carbon atoms, one of which is attached directly to a saturated carbinol carbon atom are allyl-type alcohols. They have in the molecule a structure which can be represented by the general formula:

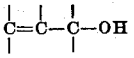

Preferred allyl-type alcohols have a terminal methylene group attached by a double bond to a carbon atom which is attached directly to a saturated carbinol carbon atom, as represented by the formula:

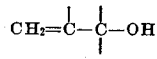

Allyl-type alcohols useful in the present invention preferably have not more than 8 carbon atoms per molecule.

Representative examples of preferred allyl-type alcohols are the following aliphatic mono-olefinic alcohols of 3 to 8 carbon atoms: allyl alcohol, methallyl alcohol, ethallyl alcohol, buten-1-ol-3, penten-1-ol-3, hexen-1-ol-3, 3-methyl-buten-1-ol-3, 3-methyl-penten-1-ol-3, 2-methyl buten-1-ol-3, 2-methyl-penten-1-ol-3, 2,3-dimethyl-buten-1-ol-3, hepten-1-ol-3, 4-methyl-hexen-1-ol-3, 5-methyl-hexen-1-ol-3, 4,4'-dimethyl-penten-1-ol-3, octen-1-ol-3, 6-methyl-hepten-1-ol-3, 4-methyl-hepten-1-ol-3, 4,4'-dimethyl-hexen-1-ol-3, etc., and more highly unsaturated allyl-type alcohols such as pentadien-1,4-ol-3, hexen-1-yn-5-ol-3, 2-methyl-penten-1-yn-4-ol-3, and 2,5-dimethyl-hexadien-1,5-ol-4. Other allyl-type alcohols are crotyl alcohol, tiglyl alcohol, hexadien-2,4-ol-1, hexadien-2,5-ol-1, butadien-2,3-ol-1, hexadien-3,5-ol-2, 2-methyl-hexen-2-ol-1, 2-methyl-penten-2-ol-1, cyclopenten-2-ol-1, cyclohexen-2-ol-1, etc.

All of the carboxyl groups of the acid may be esterified by the same unsaturated alcohol, by different unsaturated alcohols, or by one or more unsaturated alcohols and one or more saturated alcohols; or one or more of the carboxyl groups may be unesterified.

Representative examples of unsaturated esters of preferred ethereal oxygen-containing carboxylic acids are diallyl diglycolate, diallyl dilactate, diallyl dihydracrylate, dimethallyl diglycolate, dimethallyl dilactate, dimethallyl dihydracrylate, dicrotyl diglycolate, dipropargyl diglycolate, dipropargyl dilactate divinyl diglycolate, divinyl dilactate, divinyl dihydracrylate, di-isopropenyl diglycolate, di-isopropenyl dilactate, di-isopropenyl dihydracrylate, methyl ethyl ether-alpha,beta'-dicarboxylic acid diallyl ester

[CH₂=CH—CH₂—OOC—CH₂—O—
    CH₂—CH₂—COO—CH₂—CH=CH₂], methyl isopropyl ether-alpha,beta'-dicarboxylic acid diallyl ester

[CH₂=CH—CH₂—OOC—CH₂—O—
    CH(CH₃)—CH₂—COO—CH₂—CH=CH₂], methyl ethyl ether-alpha-carboxylic acid vinyl ester-beta'-carboxylic acid allyl ester

[CH₂=CH—OOC—CH₂—O—
    CH₂—CH₂—COO—CH₂—CH=CH₂], methyl isopropyl ether-alpha-carboxylic acid vinyl ester-beta'-carboxylic acid allyl ester

[CH₂=CH—OOC—CH₂—O—
    CH(CH₃)—CH₂—COO—CH=CH₂], diglycolic acid vinyl 2-propenyl ester

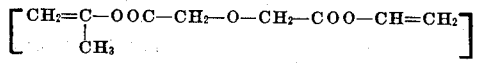

divinyl ether-beta,beta'-dicarboxylic acid di-2-butenyl ester

[CH₃—CH=CH—CH₂—OOC—CH=CH—O—
    CH=CH—COO—CH₂—CH=CH—CH₃], ethyl 2-propenyl ether-alpha-carboxylic acid vinyl ester-gamma'-carboxylic acid 4-butenyl ester

[CH₂=CH—CH₂—CH—OOC—CH=CH—
    CH₂—O—CH(CH₃)—COO—CH=CH₂], dicyclohexyl ether-4-carboxylic acid vinyl ester-4'-carboxylic acid allyl ester

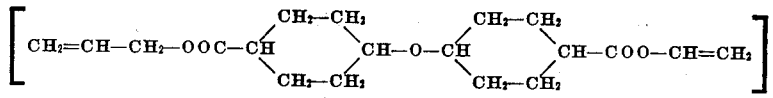

methyl ethyl ether-alpha,beta'-dicarboxylic acid-di-3-cyclohexenyl ester.

The invention is concerned with copolymers of one or more of the above or other analogous polymerizable unsaturated esters of ethereal oxygen-containing polycarboxylic acids with one or more esters of aromatic polycarboxylic acids containing in the molecule two or more polymerizable unconjugated unsaturated carbon-to-carbon linkages. The ester of the aromatic polycarboxylic acid used in the copolymer may be derived from any of the previously described alpha- or beta-unsaturated alcohols of 2 to 8 carbon atoms per molecule. As aromatic polycarboxylic acids which may be esterified are the phthalic acids which include phthalic, isophthalic and terephthalic acids, uvitinic acid, xylidic acid, trimesic acid, mono-, di-, tri- and tetrachlorophthalic acids, the naphthalene dicarboxylic acids, etc. Examples of such esters are, for instance, the unsaturated aliphatic polyesters of aromatic polycarboxylic acids such as the vinyl, allyl and methallyl polyesters of phthalic, tetrachlorophthalic, isophthalic and naphthalent dicarboxylic acids.

While any of the copolymers of the invention can be used in producing transparent fiber reinforced articles such as laminated articles comprising glass cloth laminae and the like, we have discovered that a smaller group among these copolymers is especially desirable for this particular purpose. This group consists of copolymers of 30% to 45% by weight of one or more allyl-type esters of saturated aliphatic dicarboxylic acids having the two carboxyl groups separated by an ethereal oxygen atom with 70% to 55% of one or more allyl-type esters of aromatic dicarboxylic acids. Representative examples are copolymers of diallyl diglycolate, allyl vinyl diglycolate, diallyl dilactate or diallyl dihydracrylate with diallyl phthalate, allyl vinyl phthalate, diallyl isophthalate or diallyl tetrachlorophthalate. The specifically preferred copolymer is that of diallyl diglycolate with diallyl phthalate.

In preparing transparent reinforced article using the copolymers of the invention a variety of different transparent reinforcing fibers can be employed. Inorganic fibers such as those of glass, etc. are especially advantageous because of their high strength and desirability, but transparent organic fibers such as may be produced from synthetic linear polyamides (the nylons) and interpolymers of vinyl halides with vinyl esters, e. g. Vinyon, etc. may also be advantageously used. The fibers base may be in the form of felted or woven sheets or bats. As a general rule fibers having a refractive index ($n_D^{20}$) of about 1.530 to about 1.555 are preferred.

One method of producing the laminates of the invention comprises impregnating and/or coating fibrous sheet material with a liquid comprising a fusible copolymer resin of the type described and subsequently, in the case of thermosetting resins, infusibilizing the resin. The term "fusible" is used herein to distinguish from "infusible," and designates liquid substances, as well as solid substances capable of being softened by heat without substantial decomposition or degradation.

The fibrous material can be impregnated with a mixture of copolymerizable monomers, or with a solution of a fusible copolymer in a substantially inert, i. e. non-polymerizable, solvent. A preferred procedure comprises impregnating with a mixture of monomer with a fusible polymer substantially soluble therein. Such a mixture can be produced by admixing monomer with separately produced polymer. A more convenient method of producing suitable mixtures comprises partially polymerizing the mixture of monomers, i. e. subjecting the mixture of monomers to polymerization conditions until the desired content of polymer is obtained.

Sheets of fibrous material can be impregnated individually and then superimposed forming a laminate, or unimpregnated sheets can be first superimposed and then impregnated. A preferred procedure consists in providing a quantity of the liquid containing the resin or resin-forming substance in a container, immersing sheets of the fibrous material into the liquid and assembling the laminate, that is, superimposing the sheets beneath the surface of the liquid. Impregnation and assembly are thus performed substantially simultaneously. In some cases the fusible resin or resin-forming reactants can be applied to the fibrous base material by calendering or like operations.

Laminated articles comprising the resinous copolymers can be cured by known or special methods. Temperatures of from about 100° C. to about 300° C. are usual in the case of the resinous copolymers. In many cases articles of improved hardness can be produced by the use of a two-step method of curing in which the impregnated article is first subjected to polymerization conditions at temperatures below about 100° C. until the resin has gelled. The temperature is then raised to at least about 20° C. higher than the highest temperature used in the first step of polymerization and the curing of the resin is substantially completed at such higher temperatures.

While polymerization in accordance with the invention can usually be effected in the absence of an added polymerization catalyst, better results are ordinarily obtained when a catalyst is present and polymerization usually occurs more rapidly and at a lower temperature. Many kinds of polymerization catalysts are effective. One group of effective catalysts consists of oxygen-yielding compounds, particularly peroxides. Examples of peroxide polymerization catalysts are benzoyl peroxide, acetyl peroxide, lauryl peroxide, sodium peroxide, barium peroxide, hydrogen peroxide, tertiary butyl hydroperoxide (sometimes called tertiary butyl peroxide), and the di(tertiary alkyl) peroxides, particularly di(tertiary butyl) peroxide, etc. Another group of catalysts consists of normal salts of alkaline earth metals. These include calcium, magnesium, strontium, barium and beryllium, halides, sulfates, carbonates, phosphates, nitrates, sulfites, acetates, etc.

Anhydrous cadmium salts of normal inorganic oxy acids such as cadmium sulfate or cadmium, mercury or lead difluorides, dichlorides, or dibromides may be used as catalysts as may bivalent cadmium and mercury salts of carboxylic acids such as the formates, acetates, tartrates, etc. Anhydrous bismuth trifluoride and orthophosphoric acid are other polymerization catalysts. Manganous acetate is representative of still another type of catalyst which may be used.

The optimum amount of catalyst employed in the polymerization is dependent upon many factors and no general limits can be given. Polymerization in solution or dispersion ordinarily requires more catalyst than polymerization in bulk. In general, it is preferred to employ as little catalyst as is required to bring about the reaction in a commerically feasible period of time under practical conditions of operation. Amounts of catalyst as small as about 0.01% by weight of the polymerizable material can be used. On the other hand, amounts as great as 10% or more have been employed. More usually, the range is from about 1% to about 5% of benzoyl peroxide catalyst, or its equivalent, by weight of polymerizable material.

Polymerization is generally carried out under the influence of heat, the temperature used being dependent upon many factors, particularly upon the polymerizable compounds involved and upon the conditions of polymerization. In general, temperatures of from about room temperature to about 300° C. have been used. The copolymerization of diallyl diglycolate and diallyl phthalate in accordance with the invention is preferably effected at between about 60° C. and about 250° C. employing in the lower range, e. g. 60° C. to 130° C., a catalyst, such as benzoyl peroxide, which is effective and relatively efficient in that range, and in the higher range, e. g. 130° C. to 250° C., a catalyst such as tertiary butyl hydroperoxide or a di(tertiary alkyl) peroxide. It is sometimes desirable to polymerize in two or more different steps using different temperatures and/or different catalysts.

As the polymerization of compositions comprising compounds having two or more non-conjugated polymerizable unsaturated linkages in the molecule progresses, the percentage of monomer decreases and the percentage of polymer increases. Increase in polymer content is accomplished by increase in refractive index and in viscosity. The polymer first formed is fusible and soluble in many common organic solvents. The structure of the molecule is presumably substantially linear. The polymer is soluble in the corresponding monomer and usually is soluble also in monomer of other polymerizable unsaturated compounds. It can usually be separated from its solution with monomer by precipitation with selected liquids and by fractional distillation. As polymerization progresses, cross-linking increases, and more and more of the polymer has a cross-linked or 3-dimensional structure as distinguished from the earlier produced structure. As cross-linking increases, the general solubility of the polymer decreases and the monomer/polymer mixture becomes a gel. Continued polymerization converts more of the residual monomer to polymer and also further increases cross-linking, further reducing solubility and fusibility. Eventually substantially all of the material is converted to a condition of infusibilty and insolubility in most common solvents.

Some of the many ways in which the invention can be practiced are illustrated by the following examples in which parts are on a weight basis.

*Example I*

Fine glass cloth was extracted with acetone to remove impurities, and dried. Nine sheets of the cloth approximately 5 inches square were superimposed in a glass vessel and maintained under reduced pressures. A mixture consisting of diallyl phthalate, 65 parts, diallyl diglycolate, 35 parts, and benzoyl peroxide, 5 parts, was then introduced into the vessel in an amount sufficient to completely cover the superimposed sheets, reduced pressure being maintained. The assembly of sheets, while submerged, was then provided with two glass backing plates. The assembled sandwich was then removed from the vessel, placed in an oven under a pressure of 1 p. s. i. and baked. The temperature was maintained at about 75° C. for 5 hours, then increased to about 115° C. over a period of 1 hour, and finally held at about 115° C. for 2 hours. The laminate was separated from the backing plates. The product was transparent, but slightly fluorescent. The surfaces were hard, smooth and substantially free from imperfections.

*Example II*

A laminate produced by impregnating with a mixture of diallyl phthalate, 100 parts, and benzoyl peroxide, 5 parts, using otherwise identical materials and procedure as in Example I, was not transparent, but was slightly translucent.

*Example III*

A laminate was produced in accordance with Example I, except that the impregnant was a mixture of diallyl phthalate, 55 parts, diallyl diglycolate, 45 parts, and benzoyl peroxide, 5 parts. The cured laminate was similar to the product of Example I, but was slightly less transparent.

*Example IV*

A laminate was produced in accordance with Example I, except that the impregnant was a mixture of diallyl phthalate, 70 parts, diallyl diglycolate, 30 parts, and benzoyl peroxide, 5 parts. The cured laminate was less transparent than the product of Example I.

Examples I through IV illustrate the desirable range in proportions of unsaturated esters of aromatic dicarboxylic acids to unsaturated esters of ethereal oxygen-containing acids in the copolymers used to prepare transparent fiber-reinforced articles according to the invention, the transparency being governed by the closeness with which the refractive index of the resinous copolymer matches that of the transparent fibers used, as can be seen from the following figures which include for comparison the refractive indexes of copolymers wherein the proportions of the monomers are outside the desirable range.

| Parts of Diallyl Phthalate | Parts of Diallyl Diglycolate | R. I. ($n_D^{20}$) of Copolymer in the Laminate | Difference Between R. I. of Glass Fibers of R. I. 1.5532 | Transparency |
|---|---|---|---|---|
| 80 | 20 | 1.5610 | 0.0078 | Very poor. |
| 70 | 30 | 1.5555 | 0.0023 | Good. |
| 65 | 35 | 1.5527 | 0.0005 | Excellent. |
| 55 | 45 | 1.5483 | 0.0049 | Fair. |
| 45 | 55 | 1.5417 | 0.0115 | Very poor. |

*Example V*

The composition and curing cycle of some representative copolymers which give transparent laminates of good physical properties with glass fibers are shown in the following table with the refractive index of the glass fibers of refractive index ($n_D^{20}$) 1.5521.

| Copolymer | Cure | Refractive Index ($n_D^{20}$) of Resin | Difference Between Resin and Glass Fibers |
|---|---|---|---|
| Dimethallyl phthalate, 70 parts<br>Diallyl diglycolate, 30 parts | 144 hours at 65° C. in presence of 2% benzoyl peroxide catalyst | 1.5538 | +0.0017 |
| Allyl vinyl isophthalate, 55 parts<br>Allyl vinyl diglycolate, 45 parts | 144 hours at 65° C.<br>0.5% benzoyl peroxide | 1.5507 | −0.0014 |
| Diallyl phthalate, 60 parts<br>Dimethallyl diglycolate, 40 parts | 144 hours at 65° C.<br>5% benzoyl peroxide | 1.5516 | −0.0005 |
| Allyl vinyl phthalate, 65 parts<br>Diallyl diglycolate, 35 parts | 144 hours at 65° C.<br>1% benzoyl peroxide | 1.5522 | 0.0000 |
| Dimethallyl phthalate, 65 parts<br>Dimethallyl diglycolate, 35 parts | 144 hours at 65° C.<br>3% benzoyl peroxide | 1.5514 | −0.0007 |
| Allyl vinyl phthalate, 55 parts<br>Allyl vinyl diglycolate, 45 parts | 144 hours at 65° C.<br>0.5% benzoyl peroxide | 1.5506 | −0.0015 |

*Example VI*

The effect of variations in the proportions of monomers on the transparency of panels made with glass wool of refractive index 1.5532 impregnated with copolymers of diallyl isophthalate and diallyl diglycolate polymerized with 2% benzoyl peroxide catalyst by heating 144 hours at 65° C. is shown by the following results:

| Parts of Diallyl Isophthalate | Parts of Diallyl Diglycolate | R. I. ($n_D^{20}$) of Resin | Difference in R. I. Between Resin and Glass | Transparency of Sheets |
|---|---|---|---|---|
| 80 | 20 | 1.5635 | +0.0103 | Nontransparent. |
| 70 | 30 | 1.5575 | 0.0043 | Fairly good transparency. |
| 65 | 35 | 1.5546 | 0.0014 | Very good transparency. |
| 60 | 40 | 1.5518 | −0.0014 | Do. |
| 55 | 45 | 1.5488 | −0.0044 | Fairly good transparency. |
| 50 | 50 | 1.5454 | −0.0078 | Translucent only. |
| 40 | 60 | 1.5540 | −0.0092 | Nontransparent. |

Example VII

A laminate prepared by the impregnating technique described in Example I, using 60 parts of allyl glycolate allyl phthalate and 40 parts of diallyl diglycolate in the copolymer and glass having a refractive index of 1.5415, and curing with 1 part of benzoyl peroxide for 144 hours at 65° C., has excellent transparency, the refractive index of the copolymer being 1.5418.

While the copolymers of the invention are thus of outstanding advantage in the preparation of fiber-reinforced articles having improved transparency, they can also be used in other ways. They may be used in the preparation of laminates from other fibrous sheet materials in addition to transparent materials such as glass cloth. Typical of other fibrous sheet material is woven textile fabric made from vegetable fibers such as those of cotton, hemp, jute, etc. fibers; animal fibers such as wool, horse hair, alpaca, silk, etc.; synthetic fibers which may be derived from natural proteins, e. g. casein, soybean meal, etc., or from cellulose as fibers of regenerated cellulose, cellulose acetate, etc. Felt and paper, e. g. kraft paper, can be used with the new copolymers. These copolymers can also be used for surface coating and the like or employed in the manufacture of unreinforced articles by casting, molding or other methods as illustrated in the following example.

Example VIII

A mixture of diallyl phthalate, 40 parts, diallyl diglycolate, 60 parts, and benzoyl peroxide, 2 parts, is poured into a glass mold. The mold is sealed and placed in an oven. The temperature is maintained at 65° C. for 11 hours, then increased to 90° C. over a period of 1 hour, and held at 90° C. for 12 hours. The product is a hard, clear, infusible resin, slightly yellow in color.

The new copolymers can be modified by copolymerization with other polymerizable compounds containing in the molecule two or more polymerizable unconjugated unsaturated carbon-to-carbon linkages. Examples of such other compounds are unsaturated aliphatic polyesters of saturated polybasic acids, such as the vinyl, allyl and methallyl polyesters of oxalic, malonic, glutaric, adipic, sebacic, citric and tricarballylic acids; unsaturated aliphatic polyethers of saturated polyhydric alcohols such as vinyl, allyl and methallyl polyethers of glycol, diethylene glycol, triethylene glycol, trimethylene glycol, propylene glycol, glycerol, diglycerol, pentaglycerol, pentaerythritol and the like; unsaturated aliphatic organic acid polyesters of polyhydric alcohols, such as the acrylic, methacrylic and crotonic polyesters of the polyhydric alcohols given hereinabove; unsaturated aliphatic esters of unsaturated aliphatic acids, such as vinyl, allyl and methallyl esters of acrylic, methacrylic, chloroacrylic, crotonic, itaconic, citraconic and cinnamic acids. Others contain in the molecule one or more polymerizable organic radicals and one or more inorganic radicals or elements. Examples of such compounds are vinyl, allyl and methallyl esters of phosphoric acid and of the ortho acids of silicon, boron, etc. In addition, the copolymers of the invention can be modified by the addition of one or more plasticizers, stabilizers, lubricants, dyes, pigments, fillers, drying oils, semi-drying oils, natural resins, synthetic resins, cellulose derivatives and the like. Synthetic resin modifiers can be produced by the polymerization of one or more of the hereinbefore listed or other resin-forming polymerizable compounds or by condensation-type polymerization reactions. Examples of condensation-type resins are alkyd resins, urea-aldehyde-type resins, phenol-aldehyde-type resins, synthetic linear polyamides, synthetic linear polyesters and synthetic linear polyester amides. Where the modifiers do not react with or otherwise adversely affect the ingredients of the reaction mixture, they can be added to the monomer or to the partial polymer during polymerization.

This application is a continuation-in-part of our copending application Serial No. 534,150, filed May 4, 1944, and now abandoned.

We claim as our invention:

1. A copolymer of 30 to 45 parts by weight of an ester of an unsubstituted non-aromatic polycarboxylic acid of 4 to 14 carbon atoms per molecule having at least two carboxyl groups linked directly together through an ethereal oxygen atom and not otherwise connected together wherein the hydrogen atom of a carboxyl group has been replaced by a non-aromatic hydrocarbon radical of 2 to 8 carbon atoms connected to an oxygen atom of said carboxyl group by a carbon atom which is directly joined to a carbon atom to which an olefinic double bond is directly attached and 55 to 70 parts by weight of a polyester of an unsubstituted aromatic polycarboxylic acid wherein the hydrogen atom of a carboxyl group has been replaced by a non-aromatic hydrocarbon radical of 2 to 8 carbon atoms connected to an oxygen atom of said carboxyl group by a carbon atom which is directly joined to a carbon atom to which an olefinic double bond is directly attached.

2. A copolymer of 30 to 45 parts by weight of a diester of a saturated dicarboxylic acid of 4 to 10 carbon atoms per molecule having each of the carboxyl groups linked directly to divalent saturated hydrocarbon radicals, which radicals are directly connected together through an ethereal oxygen atom and are not otherwise linked together and an aliphatic, beta mono-olefinic monohydroxy alcohol of 3 to 8 carbon atoms per molecule and 55 to 70 parts by weight of a diester of an aromatic dicarboxylic acid wherein the carboxyl groups are each linked to a divalent hydrocarbon radical and the hydrogen atom of a carboxyl group has been replaced by a non-aromatic hydrocarbon radical of 2 to 8 carbon atoms connected to an oxygen atom of said carboxyl group by a carbon atom which is directly joined to a carbon atom to which an olefinic double bond is directly attached, said copolymer having a refractive index ($n_D^{20}$) of 1.5250 to 1.5600.

3. A copolymer of 30 to 45 parts by weight of a diester of an aliphatic, saturated dicarboxylic acid of 4 to 10 carbon atoms per molecule having the carboxyl groups each directly linked to divalent saturated hydrocarbon radicals, which hydrocarbon radicals are directly joined to the same ethereal oxygen atom and are not otherwise linked together and an aliphatic, beta mono-olefinic monohydroxy alcohol of 3 to 8 carbon atoms per molecule and 55 to 70 parts by weight of a diester of a phthalic acid and an aliphatic, beta mono-olefinic monohydroxy alcohol of 3 to 8 carbon atoms per molecule.

4. A copolymer of 30 to 45 parts by weight of a diester of an aliphatic, saturated dicarboxylic acid of 4 to 10 carbon atoms per molecule having the carboxyl groups each directly linked to an alkylene radical, which alkylene radicals are directly connected by an ethereal oxygen atom and an aliphatic, beta mono-olefinic, mono-hydroxy substituted hydrocarbon having 3 to 8 carbon atoms per molecule and 55 to 70 parts by weight of a diester of an aromatic dicarboxylic acid of 8 carbon atoms per molecule having the two carboxyl groups directly attached to a benzene hydrocarbon ring and an aliphatic, beta mono-olefinic, monohydroxy substituted hydrocarbon having 3 to 8 carbon atoms per molecule, said copolymer having a refractive index ($n_D^{20}$) of 1.5250 to 1.5600.

5. A copolymer of 30 to 45 parts by weight of a diester of diglycolic acid and an aliphatic, beta mono-olefinic, monohydroxy substituted hydrocarbon having 3 to 8 carbon atoms per molecule and 55 to 70 parts by weight of a diester of phthalic acid and an aliphatic, beta mono-olefinic, monohydroxy substituted hydrocarbon having 3 to 8 carbon atoms per molecule.

6. A copolymer of 30 to 45 parts by weight of diallyl diglycolate and 55 to 70 parts by weight of a diester of phthalic acid and an aliphatic, beta mono-olefinic, monohydroxy substituted hydrocarbon having 3 to 8 carbon atoms per molecule, said copolymer having a refractive index ($n_D^{20}$) of 1.5250 to 1.5600.

7. A copolymer of 30 to 45 parts by weight of a diester of diglycolic acid and an aliphatic, beta mono-olefinic, monohydroxy substituted hydrocarbon having 3 to 8 carbon atoms per molecule and 55 to 70 parts by weight of diallyl phthalate.

8. A copolymer of 30 to 45 parts by weight of diallyl diglycolate and from 55 to 70 parts by weight of diallyl phthalate, said copolymer having a refractive index ($n_D^{20}$) of 1.5250 to 1.5600.

9. A copolymer of 30 to 45 parts by weight of dimethallyl diglycolate and from 55 to 70 parts by weight of diallyl phthalate, said copolymer having a refractive index ($n_D^{20}$) of 1.5250 to 1.5600.

10. A copolymer of 30 to 45 parts by weight of allyl vinyl diglycolate and from 55 to 70 parts by weight of diallyl phthalate, said copolymer having a refractive index ($n_D^{20}$) of 1.5250 to 1.5600.

11. A copolymer of 30 to 45 parts by weight of diallyl diglycolate and from 55 to 70 parts by weight of diallyl isophthalate.

12. A copolymer of 30 to 45 parts by weight of diallyl diglycolate and from 55 to 70 parts by weight of allyl glycolate allyl phthalate.

13. A copolymer of 30 to 45 parts by weight of diallyl diglycolate and from 55 to 70 parts by weight of a diallyl ester of a phthalic acid.

KENNETH E. MARPLE.
EDWARD C. SHOKAL.

REFERENCES CITED

The following references are of record in the file of this patent:

UNITED STATES PATENTS

| Number | Name | Date |
| --- | --- | --- |
| 2,386,999 | Adelson | Oct. 16, 1945 |
| 2,403,112 | Muskat | July 2, 1946 |